US008812739B2

(12) United States Patent
Bryant et al.

(10) Patent No.: US 8,812,739 B2
(45) Date of Patent: Aug. 19, 2014

(54) RECALIBRATION OF PRECISION CLOCKS IN A COMPUTER NETWORK

(75) Inventors: Stewart Frederick Bryant, Surrey (GB); Kenneth A. Patton, Cary, NC (US); Mark L. Hendrickson, Lafayette, CO (US); Rajiv Asati, Morrisville, NC (US); Christian Cassar, Hampton (GB)

(73) Assignee: Cisco Technology, Inc., San Jose, CA (US)

( * ) Notice: Subject to any disclaimer, the term of this patent is extended or adjusted under 35 U.S.C. 154(b) by 728 days.

(21) Appl. No.: 12/640,506

(22) Filed: Dec. 17, 2009

(65) Prior Publication Data

US 2011/0153869 A1 Jun. 23, 2011

(51) Int. Cl.
G06F 15/16 (2006.01)

(52) U.S. Cl.
USPC .......................... 709/248; 709/203; 709/227

(58) Field of Classification Search
USPC .......................................... 709/248; 370/350
See application file for complete search history.

(56) References Cited

U.S. PATENT DOCUMENTS

| | | | |
|---|---|---|---|
| 6,157,957 A | 12/2000 | Berthaud | |
| 6,400,683 B1 | 6/2002 | Jay et al. | |
| 6,542,754 B1 | 4/2003 | Sayers et al. | |
| 6,697,382 B1 | 2/2004 | Eatherton | |
| 6,750,587 B2 | 6/2004 | York et al. | |
| 7,003,062 B1 | 2/2006 | Leyn | |
| 7,015,740 B1 | 3/2006 | Feinberg et al. | |
| 7,035,246 B2 * | 4/2006 | Taylor | 370/350 |
| 7,110,423 B1 | 9/2006 | Sethuram et al. | |
| 7,111,073 B1 | 9/2006 | Jain et al. | |
| 7,151,945 B2 * | 12/2006 | Myles et al. | 455/502 |
| 7,302,269 B1 | 11/2007 | Crawford et al. | |
| 7,461,282 B2 * | 12/2008 | Cheung et al. | 713/400 |
| 7,469,328 B1 | 12/2008 | Mak et al. | |
| 7,477,191 B2 | 1/2009 | Lyons | |
| 7,480,234 B1 | 1/2009 | Hart et al. | |
| 7,567,544 B2 | 7/2009 | Myles et al. | |
| 7,609,207 B2 | 10/2009 | Lyons | |
| 7,620,836 B1 | 11/2009 | Chapman et al. | |
| 2005/0078656 A1 * | 4/2005 | Bryant et al. | 370/351 |
| 2006/0146815 A1 | 7/2006 | Tse | |
| 2007/0058652 A1 | 3/2007 | Hahn et al. | |
| 2007/0205944 A1 | 9/2007 | Lyons | |

(Continued)

OTHER PUBLICATIONS

Mills, David L., "Internet Time Synchronization: The Network Time Protocol"; IEEE Transactions of Communications, vol. 39, No. 10, Oct. 1991; Whole Document.*

*Primary Examiner* — Thomas Dailey
(74) *Attorney, Agent, or Firm* — Novak Druce Connolly Bove + Quigg LLP

(57) ABSTRACT

In one embodiment, a clock on a network device is initialized, and then a first timing message is received at the network device from a reference device having a first timestamp indicating when the first timing message was transmitted from the reference device. The network device may then determine and store a one-way delay from the first timestamp to a first time at which the first timing message was received at the network device. In response to restarting the clock, the network device may receive a second timing message from the reference device having a second timestamp indicating when the second timing message was transmitted from the reference device. The network device may then calibrate the clock such that a second time at which the network device received the second timing message is the second timestamp plus the stored one-way delay.

21 Claims, 5 Drawing Sheets

(56) References Cited

U.S. PATENT DOCUMENTS

| | | |
|---|---|---|
| 2008/0056154 A1 | 3/2008 | Firestone et al. |
| 2008/0137552 A1* | 6/2008 | Lee et al. ............... 370/252 |
| 2008/0228913 A1 | 9/2008 | Fort-Menare et al. |
| 2008/0259966 A1 | 10/2008 | Baird et al. |
| 2010/0278140 A1* | 11/2010 | Smith et al. ............ 370/331 |

* cited by examiner

US 8,812,739 B2

RECALIBRATION OF PRECISION CLOCKS IN A COMPUTER NETWORK

TECHNICAL FIELD

The present disclosure relates generally to computer networks, and, more particularly, to calibrating clocks on network devices.

BACKGROUND

As technology advances, high-precision clocks, such as atomic class clocks (e.g., a Molecular Optical Clock or "MOC"), become more available (e.g., cheaper). One concern regarding these types of clocks is how to reset their time should they lose power, since such clocks generally only maintain time while they are powered. Though it is possible to utilize backup battery supply to keep the clock running (i.e., maintain the time), the same concern applies in the event the power failure lasts longer than what the backup battery is able to support.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a precision clock on a network device is initialized, and then a first timing message is received at the network device from a reference device, the first timing message having a first timestamp that indicates when the first timing message was transmitted from the reference device. Based on the first timing message, the network device may determine, and subsequently store, a one-way delay from the first timestamp to a first time at which the first timing message was received at the network device. In response to restarting the clock, the network device may receive a second timing message from the reference device, the second timing message having a second timestamp that indicates when the second timing message was transmitted from the reference device. Based on the second timing message, the network device may calibrate the clock such that a second time at which the network device received the second timing message is the second timestamp plus the stored one-way delay.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
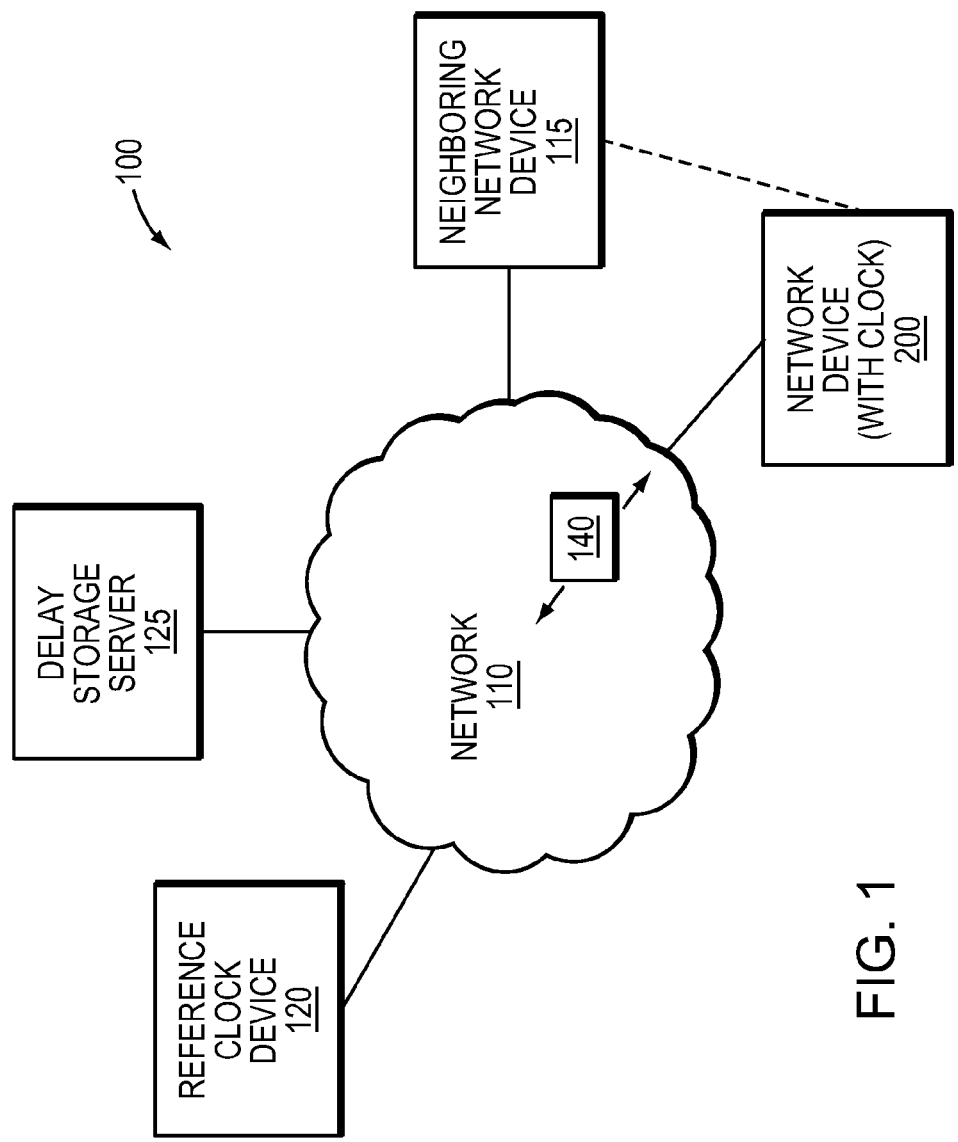
FIG. 1 illustrates an example computer network.

FIG. 1 is a schematic block diagram of an example computer network 100 illustratively comprising nodes/devices, such as a network device 200 (having a clock to be calibrated, described below), a neighboring network device 115, a reference clock device 120, and a server 125, each interconnected by links as shown via a network cloud 110. Also, data packets 140 (e.g., traffic/messages) may be exchanged among the nodes/devices of the computer network 100 using predefined network communication is protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Those skilled in the art will understand that any number of nodes, devices, links, etc. may be used in the computer network, and that the view shown herein is for simplicity.

Figure 2:
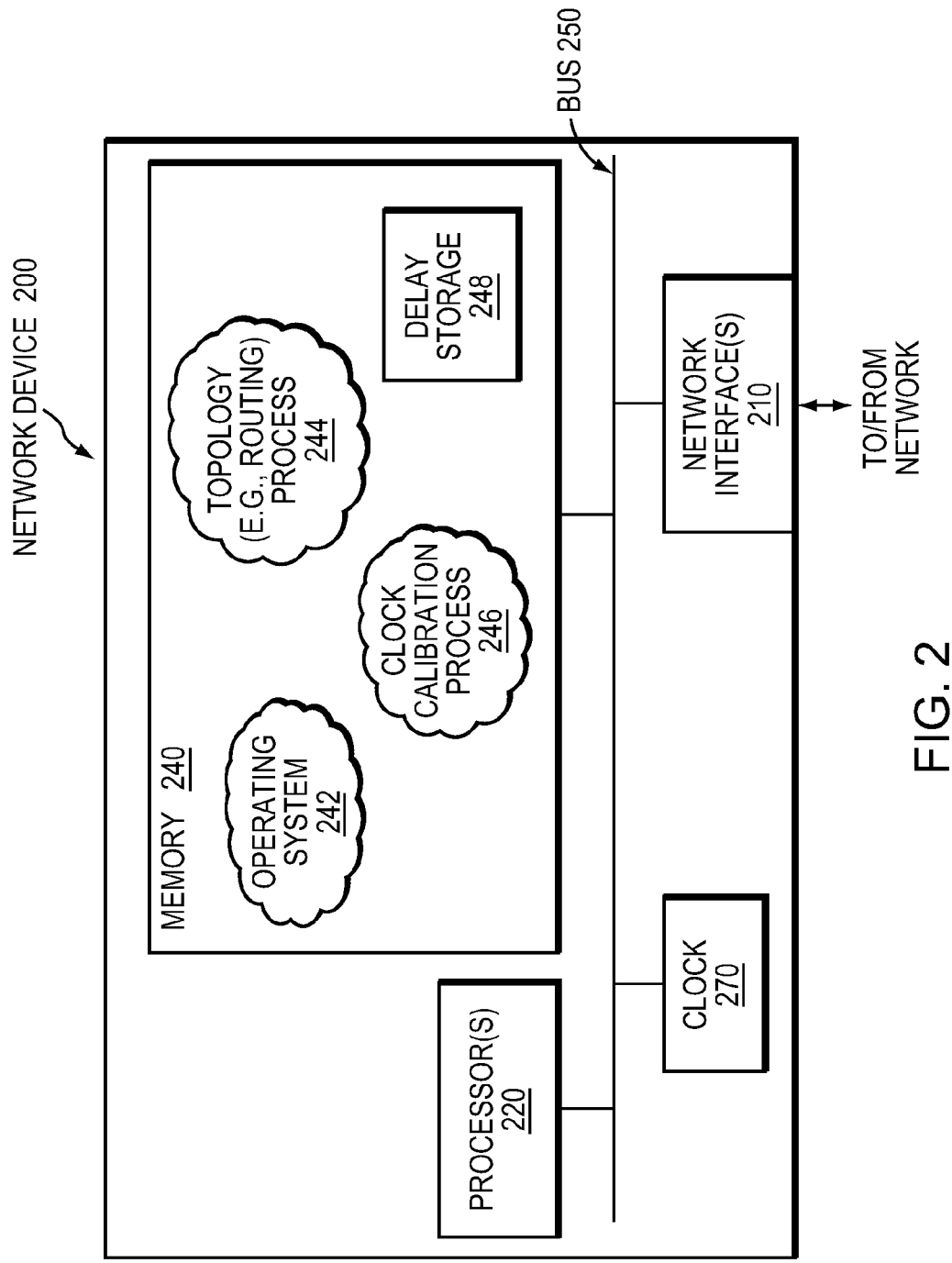
FIG. 2 illustrates an example network device/node.

FIG. 2 is a schematic block diagram of an example node/device 200 that may be used with one or more embodiments described herein, e.g., as the device 200 having the clock to be recalibrated according to the techniques herein. The device comprises one or more network interfaces 210, one or more processors 220, and a memory 240 interconnected by a system bus 250. The network interfaces 210 contain the mechanical, electrical, and signaling circuitry for communicating data over physical or wireless links coupled to the network 100 (e.g., cloud 110).

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as an illustrative one-way delay storage location 248. An operating system 242, portions of which are typically resident in memory 240 and executed by the processor(s), functionally organizes the node by, inter alia, invoking operations in support of software processes and/or services executing on the device. These software processes and/or services (or modules) may comprise a topology (e.g., routing) process/service 244 and a clock calibration process/service (or module) 246, as described in more detail below. It will be apparent to those skilled in the art that other types of processors and memory, including various computer-readable media, may be used to store and execute program instructions pertaining to the techniques described herein.

Topology (e.g., routing) process/services 244 contain computer executable instructions executed by processor 220 to perform functions provided by one or more topology protocols, such as the Interior Gateway Protocol (IGP) (e.g., link-state protocols, such as Open Shortest Path First, "OSPF," and Intermediate-System-to-Intermediate-System, "IS-IS"), the Border Gateway Protocol (BGP), etc., as will be understood by those skilled in the art. These functions may (though need not) be configured to manage a forwarding information database containing, e.g., data used to make forwarding decisions. In particular, changes in the network topology may be communicated to the device 200 using routing protocols to "converge" to a current view of the network topology. Conversely, in accordance with one or more embodiments herein, topology process 244 may simply monitor for change in network topology, and need not be concerned with the actual topology of the network, for reasons described herein.

In addition to the above components, device 200 comprises a clock 270. The clock may be a free-running high-precision clock, such as an optical clock (molecular optical clock or "MOC"), atomic clock (e.g., a chip scale atomic clock or "CSAC"), or otherwise that has an accurate oscillator to maintain a stable time base. The clock may be (i.e., may be configured to be) calibrated initially ("initialized") and subsequently ("recalibrated"), as described below, allowing for negligible time-base (unit of scale) error in timing correction (e.g., for time-of-day or "ToD") down to sub-microsecond accuracy.

As noted above, most clocks of this nature generally only maintain their accurate time while they are powered. As such, it is important to be able to reset their time should their power fail (e.g., lasting longer than any available backup battery power supply). Various techniques may be used to recalibrate the clocks 270, such as a known "timing transfer over packet" technique (e.g., a Precision Time Protocol or "PTP," a protocol that underlies the IEEE 1588 time transfer protocol, or a Network Time Protocol or "NTP"). However, when transferring time over a packet network, the clock resetting uses a sum of the time stamped by a master clock (that originated the timing packet, e.g., device 120), and a time that the network delayed the packet. The largest error in this process results from the necessity to assume that the path delay is half of the total round trip time (RTT) of the packet. Due to the high probability of asymmetric paths between the devices, this assumption is fundamentally broken and introduces significant errors. Asymmetry is generally impossible to measure by a two-way time transfer technique such as NTP or PTP, since they both posit an asymmetry error of zero to do the time transfer. Accordingly, known "timing transfer over packet" techniques are insufficient to accurately reset high-precision clocks, limiting their widespread adoption.

According to one or more embodiments of the disclosure, therefore, when manufactured or installed, high-precision (e.g., high-grade atomic/molecular) clocks are configured with a substantially exact and correct time. While operating within a network, timestamped packets are received from another device with a similarly correct time. The difference in times is measured to obtain a one-way delay that is saved. When the clock loses power and therefore the exact time, another timestamped packet may be received from the same device, and the previously measured one-way delay may be applied to the timestamp to determine the correct time. Illustratively, the techniques described herein may be performed by hardware, software, and/or firmware, such as in accordance with a clock calibration process/module 246, which may contain computer executable instructions executed by the processor 220 to perform functions relating to the novel techniques described herein, e.g., in conjunction with topology/routing process 244.

Operationally, the clock 270 is calibrated initially for time (not frequency), such as during the manufacturing or installation of the device 200 (e.g., with at least one reference timescale). For example, the clock initialization may be performed in conjunction with an external measure, such as a temporary global positioning system (GPS) reference, or other technique known to achieve a highly accurate time reference (such as locally present timing devices using a two-way timing protocol such as NTP or PTP for one time use, etc.).

In its simplest form, the network device 200, which may be a complex router or a much simpler device utilizing accurate time, establishes a network connection to a sufficiently accurate clock in the network. Basically, the device 200 is at least able to receive time information from that source ("reference") device. Assumedly, both devices should utilize the same unit of scale, i.e., a uniform time quantity, such as the SI second, and the same timescale, else the difference of the timescale(s) are known and corrected (e.g., TAI to UTC or UT0). While this reference clock device 120 may be a specific device designed to maintain an accurate clock, it may similarly be useful to have the reference device be a neighboring network device 115 with a trusted clock source. For instance, such an alternative reference may be nearby equipment having a similar high-precision clock, provided it can be assured that this clock is still in calibration. Particularly, it may be more accurate to recalibrate the clock 270 from a lower grade nearby clock, than a more distant yet more accurate clock with a more variable packet delay time, as described below. Various techniques may be used to learn the neighboring network device capabilities, such as advertisements, configuration, etc.

From this reference device 120/115, the network device 200 (having the clock to be recalibrated) may receive a timing message (e.g., packet 140) that has a timestamp indicating when the timing message was transmitted from the reference device (e.g., a PTP SYNC message may be used, but any packet format configured to carry the desired information is equally acceptable, such as by triggering an NTP response, etc.).

Figure 3B:
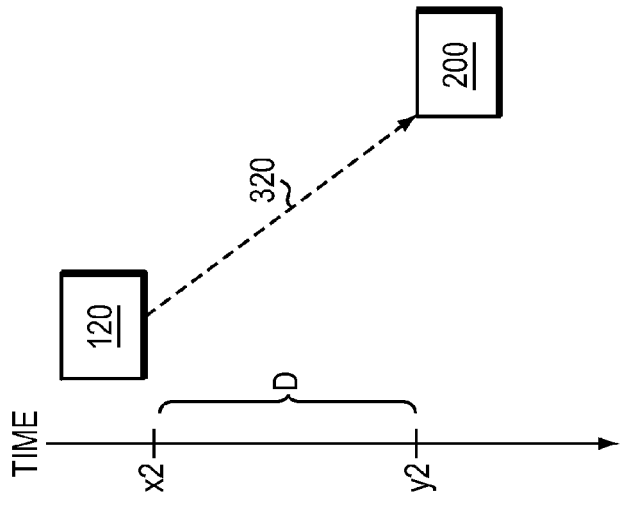
FIGS. 3A-B illustrate example timing diagrams and calculations.
Figure 3A:
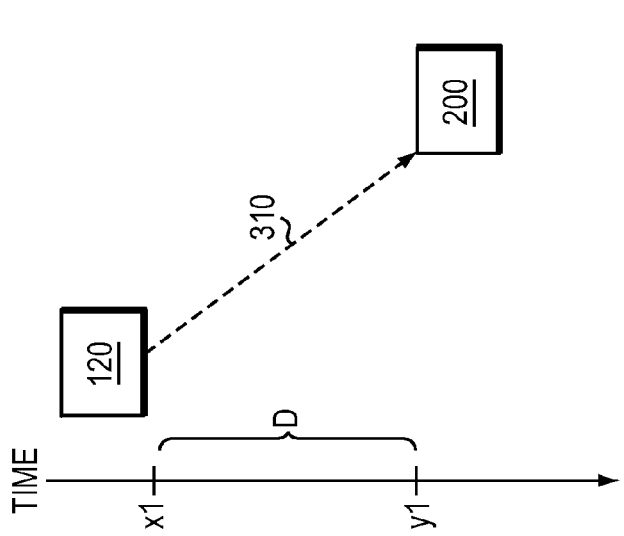

FIG. 3A illustrates an example timing diagram of the transmission of the timing message 310 from the reference 120 to the network device 200. For instance, the message 310 may be transmitted at time "x1," which is stamped into the message 310. At receipt of the message, the network device 200 may also generate a timestamp for time "y1" for the time at which the timing message was received.

The one-way delay "D" from the transmit timestamp x1 to the receive timestamp y1 may then be determined (D=y1−x1), which is presumed to be accurate due to the high-precision clocks at both the reference and receiving devices that have been previously calibrated. This trusted one-way delay value corresponding to that particular reference device may be stored on either non-volatile storage of the network device (e.g., on the clock 270 itself or in memory 240 as shown), or on a different device in the computer network, such as the reference device/clock providing the timing message (e.g., 120) or in some other server 125, in order to be maintained during a power failure of the clock 270 and/or device 200. (Note that since this measurement is the one-way delay, the asymmetry problem associated with two-way time transfer protocols above generally does not apply.)

In the event the clock is restarted, such as after a power outage or for other reason, the device 200 (clock 270) may again establish a connection to the initial reference device (its corresponding clock). The device 200 may then reads a new timestamp in a new timing packet and uses this to modify its own time so that the one-way delay is the same as it was before the outage. In other words, as shown in FIG. 3B, a second timing message 320 may be received at the network device 200 from the same reference device 120 as the previous timing message 310. This message 320 also carries a timestamp "x2" that indicates when the timing message 320 was transmitted from the reference device 120. The clock 270 (which may have been resumed/restarted simultaneously with the power up, but no later than receipt of the second timing message 320) may generate a second timestamp "y2" at the receipt of the message 320, just as before. The clock 270 may then be calibrated such that the time at which the network device received the second timing message 310 (y2) is the second timestamp x2 plus the stored one-way delay D. Alternatively stated, and as shown, the adjustment necessary to correct the clock 270 after becoming inaccurate is $A=(x2+D)-y2$, where $(x2+D)$ is the correct time at which the device 200 actually received the message 320 (assuming a same one-way delay as before the power outage), and y2 is the time the device thought it was when it received the message 320. (Note that the time calibration may also include any difference with regard to the timescale and epoch of the reference clock.) As such the calibration may take place via determining the second time at which the network device received the second timing message, determining an offset between the second time and the second timestamp plus the stored one-way delay, and adjusting the clock by the determined offset.

Figure 4:
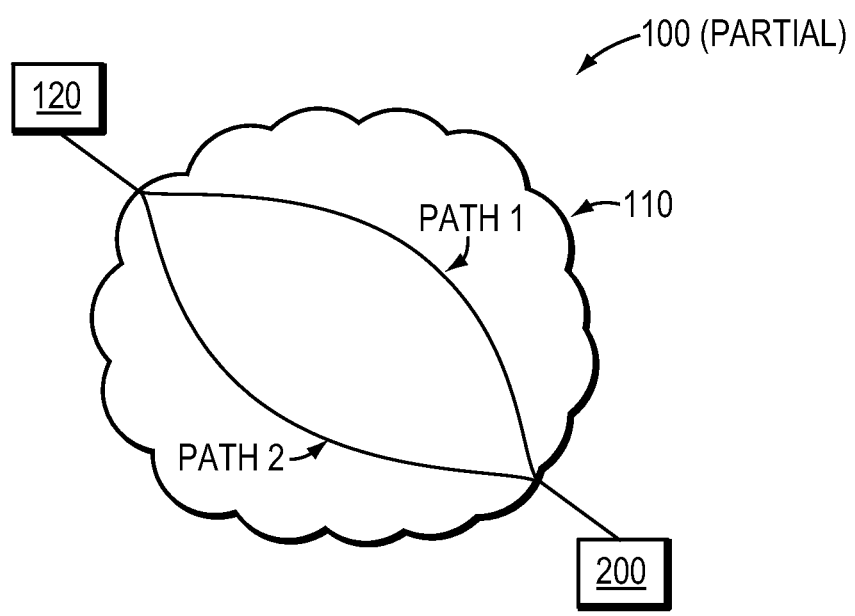
FIG. 4 illustrates example paths through the computer network.

It is important to note that this technique assumes that the one-way delay prior to the recalibration is the same as that afterward. If the path is not identical (such as shown in FIG. 4, "path 1" and "path 2"), the delay will not be deterministically identical, and that particular reference device can no longer be used to recalibrate the clock 270 that lost power. By comparing a network path from the reference device 120/115 to the network device 200 for the first timing message 310 and the second timing message 320, it may first be ensured that the paths are equal prior to calibrating the clock 270. For example, the topology of the network prior to the power outage (or at the very least, the path of delay calculation) should be stored along with the one-way delay itself. Note that the topology of the network may be recovered to ensure that the path is unchanged between the measurement to establish the delay and the measurement to reset the time. In this manner, when the current path from the calibration source (reference device) to the clock 270 undergoing recalibration is restored, the recalibration may be considered more accurate, accordingly.

Illustratively, the paths may be determined using a link state routing protocol, such as by running a shortest path first (SPF) protocol operation rooted at the clock source (reference device) and comparing the current path with the path that was current during the period of calibration. Alternatively, a path vector protocol or a traceroute protocol may be used to determine the first and second paths to ensure consistency in the path between delay calculation and time recalibration. Note further that it may be necessary to ensure that equal-cost multi-path routing or "ECMP" does not factor into the measurements by ensuring that the timing messages do not pass over an ECMP path, such as by using a multi-topology routing or "MTR" approach, as may be appreciated by those skilled in the art.

Notably, as a preventative measure, in the event that the network device 200 (clock 270) learns of a topology change in the network prior to a power outage, then a new one-way delay value may be computed (re-determined) and stored. For example, topology process 244 (or an external router/server) may inform the clock being calibrated that the topology has changed, thereby invalidating the path delay that is currently stored. This implies, too, that the clock systems (clock calibration process 246) need not participate in topology (e.g., routing) protocols, but can still take advantage of knowledge of the changes.

The accuracy and precision of the initial one-way delay measurement and the stability of this delay measurement after initial measurement and storage are fundamental for the quality of the time accuracy recovery after failure. As such, according to one or more embodiments herein, in order to provide a more robust solution, the one-way delay value need not be set on the basis of a single timing message. For instance, this may alleviate the problem where in a small number of cases the exact same path may have new equipment or equipment modifications along the path that modify a single one-way delay. In one embodiment, a plurality of first timing messages 310 may be received from a same reference device (e.g., 120 or 115), and the one-way delay is established on the basis of a lowest delay, since the lowest delay is a hard limit that is not affected by queuing delays in the network. Alternatively, the delay may also be set on the basis of a mean delay or on the basis of some similar reliable statistical property of the delay distribution. In either situation, upon restarting the clock 270, multiple messages 320 may again be used, and the lowest adjustment or the mean adjustment may be utilized for clock calibration, accordingly. For example, it a first adjustment is 5 ms, and a second adjustment is 6 ms, and a third is 7 ms, etc., then the clock may use the 5 ms adjustment, as it corresponds to the lowest one-way delay between the two devices. The same logic applies to using the mean delays from before and after power outage.

In another embodiment, the path delay may be measured with respect to a plurality of different reference devices (clocks) in the network (e.g., 120 and 115). The one-way delay for each of the different reference devices may be stored prior to recalibration, such that in response to restarting the clock, new timing messages 320 may be received from the same set of devices, and a particular one-way delay from a reference device may be utilized for calibrating the clock such that the clock is recalibrated to an earliest time (i.e., the shortest/lowest one-way delay value, representative of the most accurate and unchanged one-way delay post restart). Alternatively or in addition, the delay from a reference device having a path of its respective second timing message 320 that is equal to an original path of the first respective timing message 310 may be used to calibrate the clock (i.e., as the same path is the most accurate and presumably unchanged one-way delay post restart). In these ways, any small inconsistencies or problems with using a single point of reference are alleviated, where a redundancy scheme (and cross-checking scheme) is created through the use of multiple timing points of reference.

Moreover, as further protection against such inconsistencies or problems, it may be arranged such that each of the plurality of first timing messages 310 (and subsequent messages 320) are received over a dedicated path from the reference device to the network device 200 that is at least partially disjoint from the other paths. That is, it may be desirable to use a mechanism such as Multi-Protocol Label Switching Traffic Engineering (MPLS-TE) or MTR to establish multiple disjoint or partially disjoint paths between the reference clock device and the clock 270 undergoing recalibration to allow recalibration during a temporary or permanent topology change (i.e., increasing the chances that at least one path before and after clock restart is the same). Illustratively, FIG. 4 also shows two partially disjoint paths (path 1 and path 2) between the reference device 120 and network device 200.

That is, a first set of messages 310/320 would use path 1, and a second set of messages 310/320 would use path 2 (where, messages 310 and 320 of a set do not use the same path, then the one-way delay measurements are invalid for that set and only that set).

Figure 5:
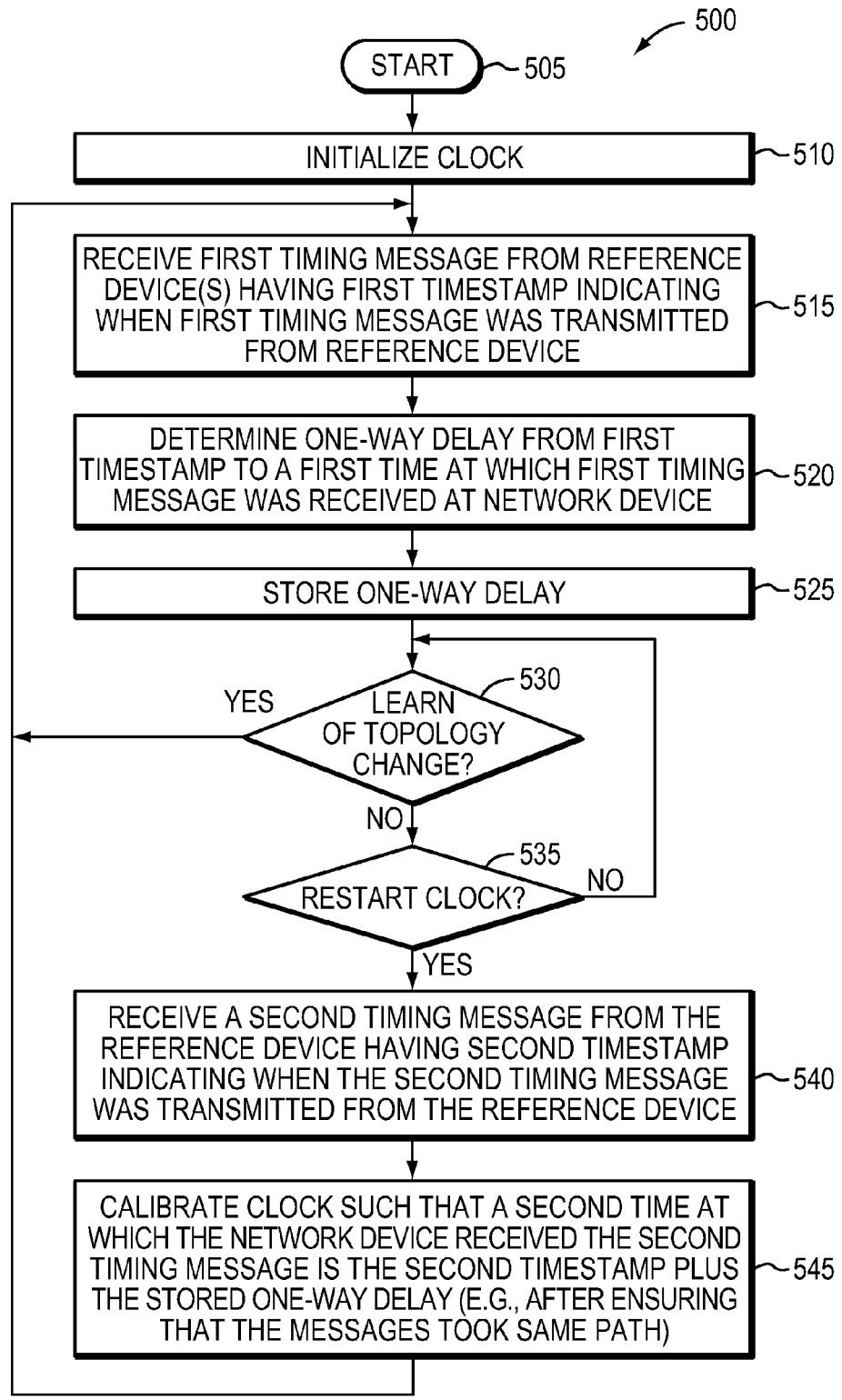
FIG. 5 illustrates an example procedure for calibrating a clock on a network device.

FIG. 5 illustrates a simplified example procedure for recalibrating precision clocks in accordance with one or more embodiments described herein. The procedure 500 starts at step 505, and continues to step 510, where the clock 270 of a network device 200 is initialized, e.g., through external measures as described above. After the clock has been initialized, the network device (e.g., clock calibration process 246) may receive a first timing message 310 from one or more reference devices 120/115 in step 515 that has a corresponding first timestamp indicating when the message 310 was transmitted from respective reference device (e.g., x1). Based on the current accurate time of clock 270 and the received timestamp, in step 520 the device may determine the one-way delay, i.e., the delay from the first timestamp to a first time (e.g., y1) at which the first timing message 310 was received at network device. The one-way delay D (e.g., the lowest, mean, etc.) may then be stored in step 525, e.g., in a non-volatile location or remote device as mentioned above. Also, in the event of a topology change in step 530, the procedure 500 may return to step 515 to re-measure the one-way delay based on the new topology in the network.

Upon restarting of the clock in step 535, such as in response to a power failure or other recalibration necessitating event, the procedure 500 continues to step 540, where the network devices awaits receipt of a second timing message 320 from the same reference device 120/115 having a second timestamp indicating when the second timing message was transmitted from the reference device (e.g., x2). As described in more detail above, in step 545 the network device may calibrate (e.g., recalibrate) the clock 270 such that a second time (e.g., y2) at which the network device received the second timing message is the second timestamp plus the stored one-way delay, i.e., adjusting the current clock by an amount equal to: x2+D−y2. Notably, as mentioned above, step 545 may require that the network device ensure that the messages 310 and 320 took the same path through the network. The procedure 500 may return to step 515 to maintain a current one-way delay value in case another clock-corrupting event occurs at the device 200.

Advantageously, the novel techniques described herein recalibrate precision clocks in a computer network. By measuring and recording one-way delay between a trusted clock and the calibrating device, the novel techniques allow for the resetting of high-grade (e.g., atomic/molecular class) clocks following a power failure based on the premise that the one-way delay after the power failure is the same as before the power failure. In particular, the techniques described above remove the significant errors associated with path delay asymmetry in two-way time transfer technology, and avoid having complex timing engineering and specific functions in intermediate nodes (e.g., operating and capital expenditures) by leveraging low cost high-precision (e.g., atomic) clocks. Such sub-microsecond phase or time accuracy may be specifically useful to achieve time-of-day (ToD) precision for various online devices or for mobile devices (e.g., phones) for one-way delay performance measurement accuracy. In addition, by using the one-way delay, recovery of time accuracy is allowed after failure by removing the asymmetry problem that is tied to any two-way time transfer (TWTT) protocol such as NTP or PTP.

While there have been shown and described illustrative embodiments that recalibrate precision clocks in a computer network, it is to be understood that various other adaptations and modifications may be made within the spirit and scope of the embodiments herein. For example, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   initializing a clock on a network device in a computer network;
   receiving a first timing message at the network device from a reference device in the network, the first timing message having a first timestamp that indicates when the first timing message was transmitted from the reference device;
   determining a one-way delay using a difference between the first timestamp that indicates when the first timing message was transmitted from the reference device and a first time at which the first timing message was received at the network device;
   storing the one-way delay at the network device;
   restarting the clock on the network device;
   in response to restarting the clock:
      receiving a second timing message at the network device from the reference device, the second timing message having a second timestamp that indicates when the second timing message was transmitted from the reference device; and
      calibrating the clock such that a second time at which the network device received the second timing message is the second timestamp plus the stored one-way delay;
   utilizing a plurality of first timing messages to determine the one-way delay, wherein the plurality of the first timing messages are received from different reference devices; and
   storing a one-way delay for each of the different reference devices.

2. The method as in claim 1, further comprising:
   checking that a second path from the reference device to the network device thought the network for the second timing message is equal to a first path from the reference device to the network device thought the network for the first timing message, prior to calibrating the clock.

3. The method as in claim 2, further comprising:
   utilizing one of a shortest path first (SPF) protocol, a path vector protocol, or a traceroute protocol to determine the first and second paths.

4. The method as in claim 1, wherein the plurality of first timing messages are received from a same reference device.

5. The method as in claim 4, further comprising:
   storing and utilizing a lowest one-way delay.

6. The method as in claim 4, further comprising:
   determining a mean one-way delay based on the plurality of first timing messages; and
   storing and utilizing the mean one-way delay.

7. The method as in claim 1, further comprising:

storing a one-way delay for each of the different reference devices;

utilizing a particular one-way delay for calibrating the clock such that the clock is recalibrated to an earliest time.

8. The method as in claim 1, further comprising:
utilizing at least one of the one-way delays from a reference device having a second path of a respective second timing message that is equal to a first path of the first respective timing message to calibrate the clock.

9. The method as in claim 1, wherein each of the plurality of first timing messages are received over a dedicated at least partially disjoint path from the reference device to the network device.

10. The method as in claim 1, further comprising:
learning of a topology change in the computer network; and in response,
re-determining the one-way delay.

11. The method as in claim 1, wherein storing further comprises:
storing the one-way delay on either non-volatile storage of the network device or on a different device in the computer network.

12. The method as in claim 1, wherein the reference device is a neighboring network device.

13. The method as in claim 1, wherein calibrating further comprises:
determining the second time at which the network device received the second timing message;
determining an offset between the second time and the second timestamp plus the stored one-way delay; and
adjusting the clock by the determined offset.

14. An apparatus, comprising:
a clock configured to be calibrated, after an initial calibration, in response to a clock restart;
one or more network interfaces to receive timing messages from a reference device in a computer network;
one or more processors coupled to the network interfaces and adapted to execute one or more processes; and
a clock calibration module configured to:
determine a one-way delay using a difference between a first timestamp of a first timing message received from the reference device and a first time at which the first timing message was received at the network device, the first timestamp to indicate when the first timing message was transmitted from reference device;
store the one-way delay;
restart the clock on the network device;
in response to restarting the clock, calibrate the clock such that a second time at which the a second timing message is received is a second timestamp plus the stored one-way delay, the second timestamp from a second timing message received from the reference device that indicates when the second timing message was transmitted from the reference device;
utilize a plurality of first timing messages to determine the one-way delay, wherein the plurality of the first timing messages are received from different reference devices; and
store a one-way delay for each of the different reference devices.

15. The apparatus as in claim 14, wherein the clock calibration module is further configured to:

checking that a second path from the reference device to the network device though the network for the second timing message is equal to a first path from the reference device to the network device though the network for the first timing message, prior to calibrating the clock.

16. The apparatus as in claim 14, wherein the clock calibration module is further configured to:
utilize a plurality of first timing messages received from a same reference device to determine the one-way delay.

17. The apparatus as in claim 14, wherein the clock calibration module is further configured to:
utilize a plurality of first timing messages received from different reference devices to determine the one-way delay.

18. The apparatus as in claim 14, wherein the clock is an optical clock.

19. The apparatus as in claim 14, wherein the clock calibration module is further configured to calibrate the clock by:
determining the second time at which the network device received the second timing message;
determining an offset between the second time and the second timestamp plus the stored one-way delay; and
adjusting the clock by the determined offset.

20. A non-transitory computer-readable medium having software encoded thereon, the software when executed operable to:
initialize a clock on a network device in a computer network;
process a first timing message received from a reference device in the network, the first timing message having a first timestamp that indicates when the first timing message was transmitted from the reference device;
determine a one-way delay by taking a difference between the first timestamp that indicates when the first timing message was transmitted from the reference device and a first time at which the first timing message was received at the network device;
store the one-way delay at the network device;
restart the clock on the network device;
receive a second timing message from the reference device, the second timing message having a second timestamp that indicates when the second timing message was transmitted from the reference device; and
calibrate the clock on the network device using a second time that is
based on the second timestamp plus the stored one-way delay;
utilize a plurality of first timing messages to determine the one-way delay, wherein the plurality of the first timing messages are received from different reference devices; and
store a one-way delay for each of the different reference devices.

21. The non-transitory computer-readable medium as in claim 20, wherein the software when executed is further operable to:
compare a second path from the reference device to the network device though the network for the second timing message to a first path from the reference device to the network device though the network for the first timing message to verify that the second path and the first path are equal, and
wherein the calibration is performed in response to verification that the second path and the first path are equal.

* * * * *